(12) United States Patent
Li

(10) Patent No.: US 8,749,958 B2
(45) Date of Patent: Jun. 10, 2014

(54) PORTABLE ELECTRONIC DEVICE WITH AUTOMATIC PROTECTION CAPABILITY

(75) Inventor: Qiang Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 1316 days.

(21) Appl. No.: 12/498,458

(22) Filed: Jul. 7, 2009

(65) Prior Publication Data

US 2010/0164152 A1  Jul. 1, 2010

(30) Foreign Application Priority Data

Dec. 25, 2008  (CN) .......................... 2008 1 0306539

(51) Int. Cl.
*G06F 1/16* (2006.01)
*F16M 1/00* (2006.01)

(52) U.S. Cl.
USPC ...................................... 361/679.02; 267/136

(58) Field of Classification Search
USPC ............ 267/140.15, 70, 136, 139; 280/730.1, 280/730.2, 728.1, 735; 188/372; 296/187.03, 187.07; 180/274, 282; 73/200; 361/679.02
See application file for complete search history.

(56) References Cited

U.S. PATENT DOCUMENTS

| | | | | |
|---|---|---|---|---|
| 4,170,374 A | * | 10/1979 | Garcia | 292/201 |
| 5,558,300 A | * | 9/1996 | Kalberer et al. | 244/121 |
| 7,059,182 B1 | * | 6/2006 | Ragner | 73/200 |
| 7,375,645 B2 | * | 5/2008 | Tsai | 340/665 |
| 7,455,147 B2 | * | 11/2008 | Brei et al. | 180/274 |
| 7,556,117 B2 | * | 7/2009 | Browne et al. | 180/274 |
| 8,330,305 B2 | * | 12/2012 | Hart et al. | 307/650 |
| 8,430,381 B2 | * | 4/2013 | Chen | 267/140 |
| 2006/0290126 A1 | * | 12/2006 | Kohlem et al. | 280/756 |

* cited by examiner

*Primary Examiner* — Thomas Irvin
(74) *Attorney, Agent, or Firm* — Novak Druce Connolly Bove + Quigg LLP

(57) ABSTRACT

A portable electronic includes a main body defining a plurality of mounting holes at corners; a plurality of mounting modules; a plurality of resilient members compressed and mounted in mounting holes of the main body by the corresponding mounting modules; and a control module. The control module includes a MCU; an acceleration transducer connected to the MCU to sample a real-time acceleration value, and a memory connected to the MCU to store a critical acceleration value. The control module controls the mounting modules to release the compressed resilient members so as to eject out the resilient members from the main body, when the real-time acceleration value is larger than the critical acceleration value.

12 Claims, 4 Drawing Sheets

PORTABLE ELECTRONIC DEVICE WITH AUTOMATIC PROTECTION CAPABILITY

BACKGROUND

1. Technical Field

The present disclosure relates to portable electronic devices, and, particularly, to a portable electronic device with an automatic protection capability.

2. Description of the Related Art

With the development of wireless communication and information processing technologies, portable electronic devices, such as mobile phones and personal digital assistants (PDAs), are now in widespread use. However, when a portable electronic device accidentally drops, not only can the outer appearance get damaged but the underlying electrical circuits of the portable electronic device may also be damaged.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
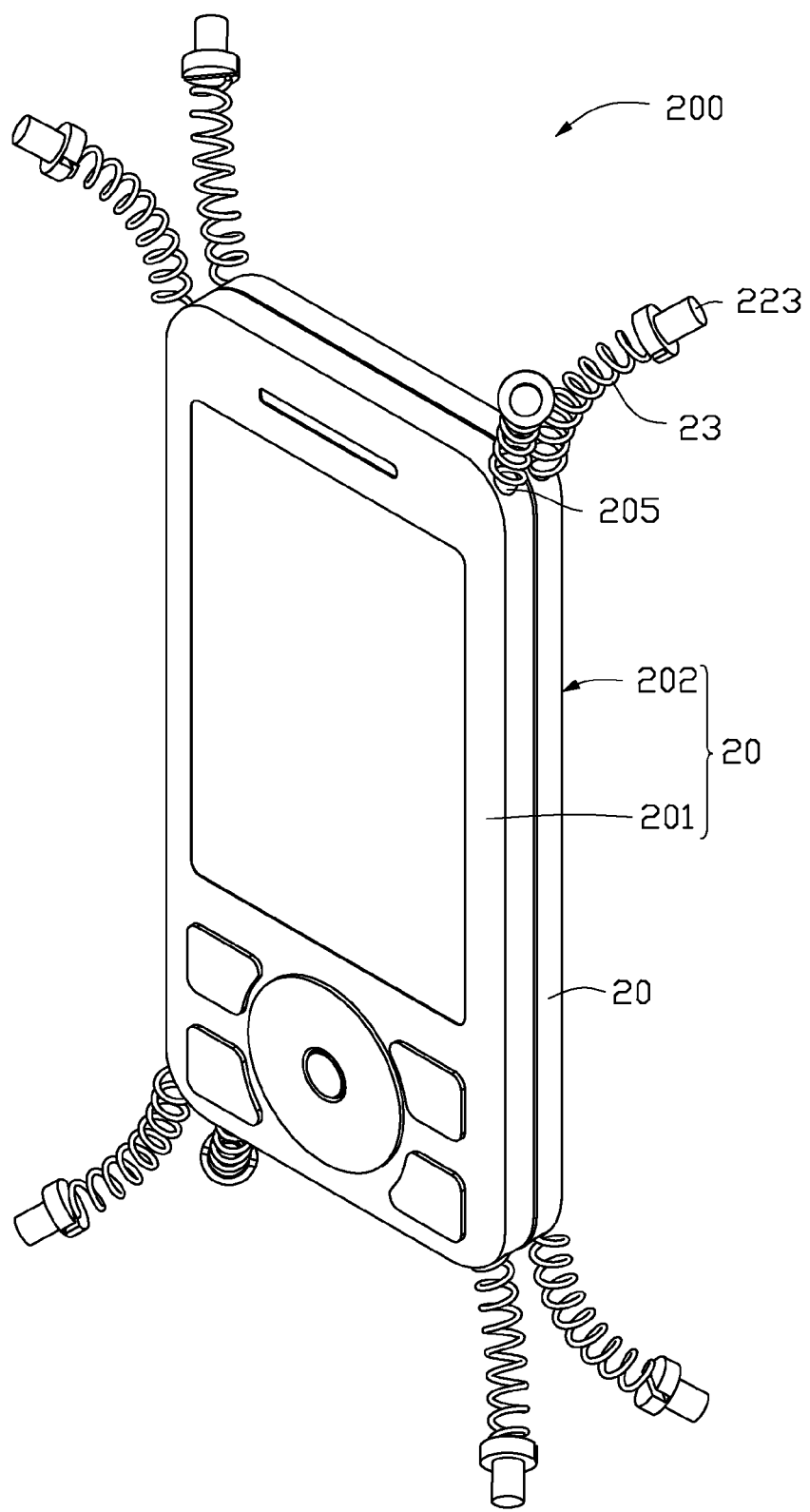
FIG. 1 is an assembled, isometric view of an exemplary embodiment of a portable electronic device with a plurality of resilient members.

Referring to FIG. 1, an exemplary embodiment of a portable electronic device 200 is shown. The portable electronic device 200 may be a mobile phone, a laptop, a media player, a watch, a flashlight, a communication device, and the like. The portable electronic device 200 includes various modules for performing corresponding function and features, however for simplicity, in the following preferred embodiment only the modules related to protect the portable electronic device automatically when the portable electronic device experiences a sudden change in position. In the illustrated embodiment, the portable electronic device 200 is a mobile phone.

Figure 2:
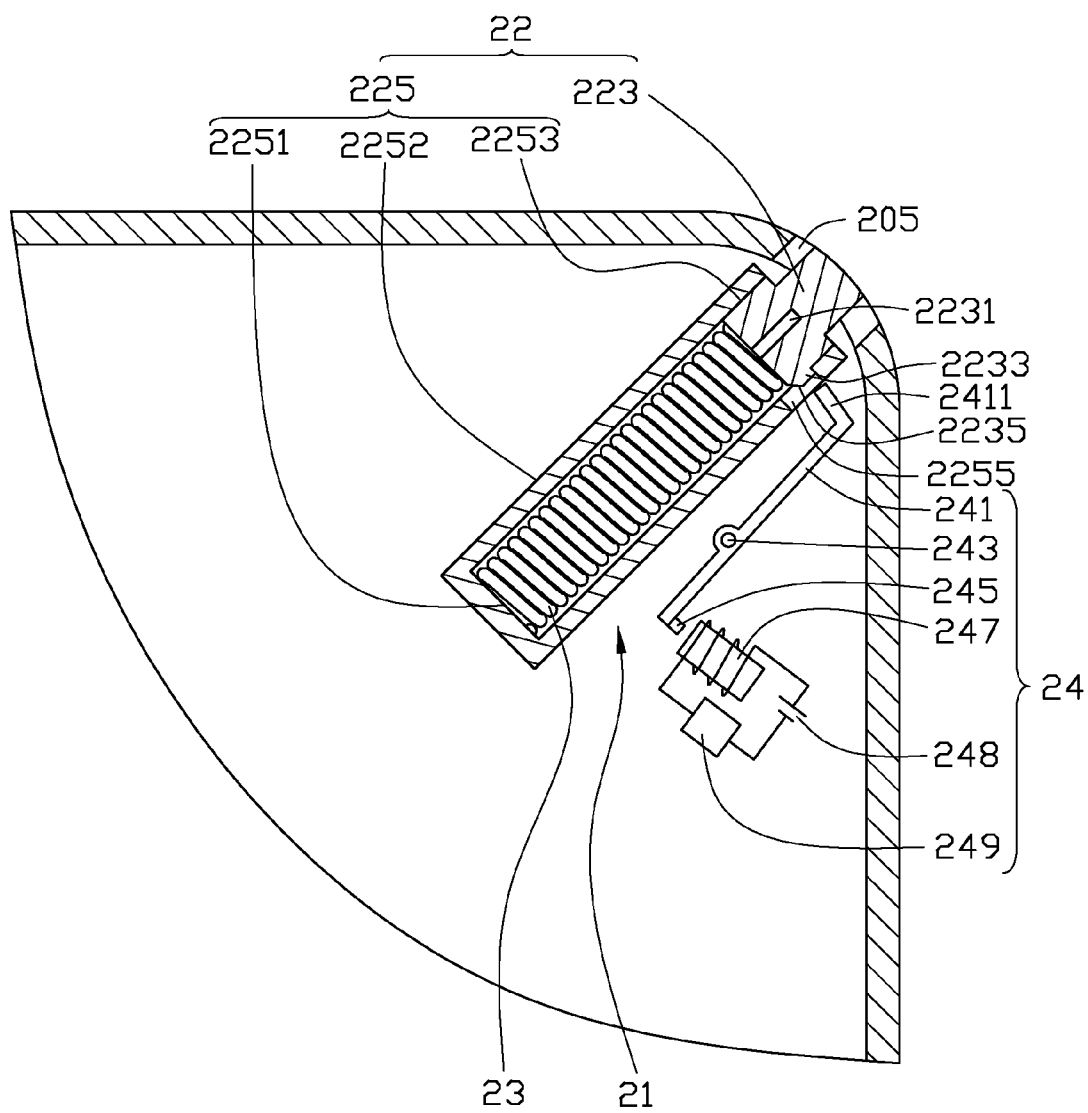
FIG. 2 is a partial, cut away view of the portable electronic device of FIG. 1.
Figure 3:
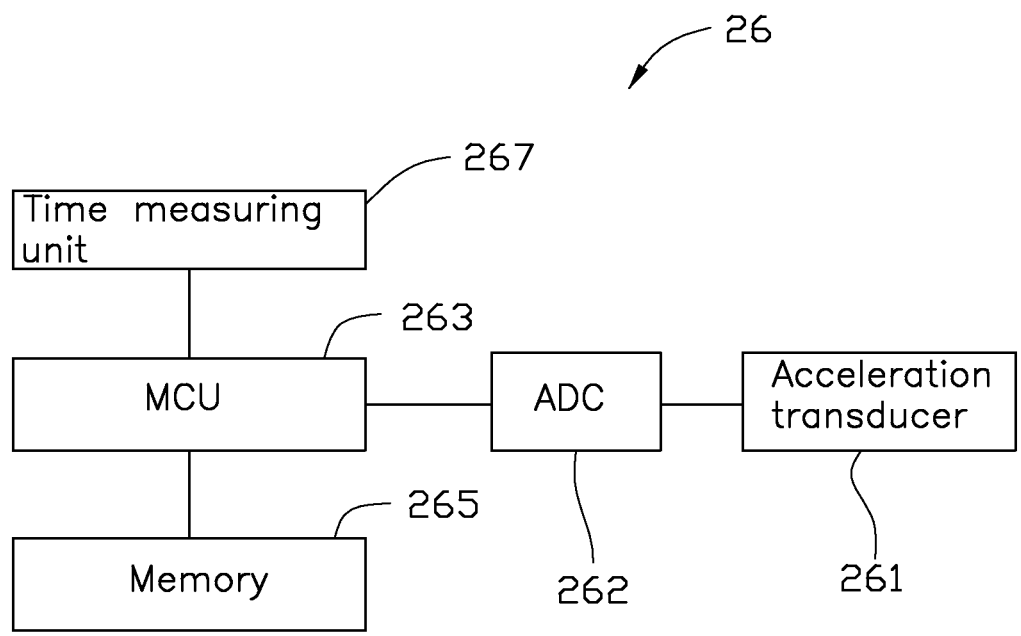
FIG. 3 is a block diagram of a control module of the portable electronic device of FIG. 1.

Referring to FIGS. 1 through 3, the exemplary portable electronic device 200 includes a main body 20, eight mounting modules 21, eight resilient members 23 and a control module 26. The main body 20 is typically substantially rectangular. The main body 20 includes a first surface 201 and a second surface 202 opposite to the first surface 201. The main body 20 defines eight mounting holes 205 at four corners of the main body 20. In other words, a pair of the mounting holes 205 is defined in each corner of the main body 20. The resilient members 23 are mounted in the mounting holes 205 of the main body 20 by the corresponding mounting modules 21. The control module 26 may control the mounting modules 21 to release the compressed resilient members 23 to protect the portable electronic device 200 when the portable electronic device 200 moves with a large acceleration.

Referring to FIG. 2 again, each mounting module 21 includes a latching unit 22 and an actuating unit 24. Each latching unit 22 includes a latching member 223 and a container 225 to receive one of the resilient members 23. The container 225 is tubular, and includes a circular base 2251 and a sidewall 2252 extending from a periphery of the base 2251. The base 2251 and the sidewall 2252 cooperatively define an opening 2253 facing the corresponding mounting hole 205. The container 225 further defines a latching hole 2255 in the sidewall 2252 adjacent to the opening 2253.

The latching member 223 is a block matching with the opening 2253 of the container 225. One end of the resilient member 23 is fixed to an end surface of the latching member 223. The latching member 223 defines a latching protrusion 2233 at a side of the latching member 223, and adjacent to the resilient member 23 corresponding to the latching hole 2255. The latching protrusion 2233 is engaged in the latching hole 2255 to press the resilient member 23 into the container 225. The latching member 223 further defines an elongated slot 2231 in the end surface that fixes the resilient member 23, to increase the elastic capability of the latching member 223. The latching protrusion 2233 further defines a slanted side surface 2235 extending toward the end surface that fixes the resilient member 23. The latching member 223 may be easily mounted into the container 225 due to the elongated slot 2231 and the slanted side surface 2235.

The actuating unit 24 is configured to release the resilient member 23 from the container 225 by detaching the latching protrusion 2233 from the latching hole 2255. The actuating unit 24 includes a connecting rod 241, a hinge 243, a magnetic member 245, an electromagnet 247, a battery 248, and a switch 249. The hinge 243 includes a rotary shaft (not labeled) fixed in the main body 20 and a torsion spring (not shown) sleeved over the rotary shaft. The connecting rod 241 is an L-shaped rod. The connecting rod 241 includes a pressing portion 2411. A middle part of the connecting rod 241 is rotatably fixed to the rotary shaft and the torsion spring resists the connecting rod 241. The pressing portion 2411 is positioned to face the latching protrusion 2233. The connecting rod 241 is rotatable relative to the rotary shaft of the hinge 243. The magnetic member 245 is a permanent magnet fixed to an end of the connecting rod 241 away from the pressing portion 2411. In an alternative embodiment, the magnetic member 245 is an iron block.

The electromagnet 247, the battery 248, and the switch 249 are positioned in the main body 20, and electrically connected to form a circuit. The electromagnet 247 is positioned adjacent to the magnetic member 245. The switch 249 stays in the closed state until it receives a break signal from the control module 26. After receiving the break signal, the switch 249 changes to an open state wherein the circuit of the battery 248 and the electromagnet 247 is electrically connected. Accordingly, the electromagnet 247 attracts the magnetic member 245 to rotate the connecting rod 241 relative to the hinge 243, and the pressing portion 2411 of the connecting rod 241 presses the latching protrusion 2233 so as to detach the latching protrusion 2233 from the latching hole 2255. Finally, the compressed resilient member 21 is released, and is ejected out from the container 22. In this embodiment, referring to FIG. 1, the released resilient members 23 are bendable. Each of the released resilient members 23 is bent towards the first surface 201 or the second surface 202 at an angle (about 45 degrees) relative to the first surface 201 or the second surface 202. This configuration increases a dependability of protecting the portable electronic device 200.

Referring to FIG. 3, the control module 26 includes an acceleration transducer 261, an analog-to-digital converter 262 (hereinafter referred to as ADC), a micro-controller unit 263 (hereinafter referred to as MCU), a memory 265, and a time measuring unit 267.

The acceleration transducer 261 is used to sample a real-time analog acceleration signal of the portable electronic device 200. The ADC 262 converts the analog acceleration signal into a digital acceleration value. The time measuring unit 267, connected to the MCU 263, is used to sample a real-time moving time value. The memory 265, connected to the MCU 263, stores a critical acceleration value and a critical secure time value. The critical acceleration value represents the maximum acceleration that the portable electronic device 200 can be subjected to before causing damage to the portable electronic device 200. The critical secure time value can be set according to a laboratory test of the portable electronic device 200 moving one meter with a relative larger acceleration. The critical acceleration value can be set according to a laboratory test result values deduced by repeated dropping and collision, or can be set to the average value of the acceleration due to gravity. In the illustrated embodiment, the critical acceleration of the portable electronic device 200 is 9 m/s$^2$. The critical secure time is 0.32 second.

Figure 4:
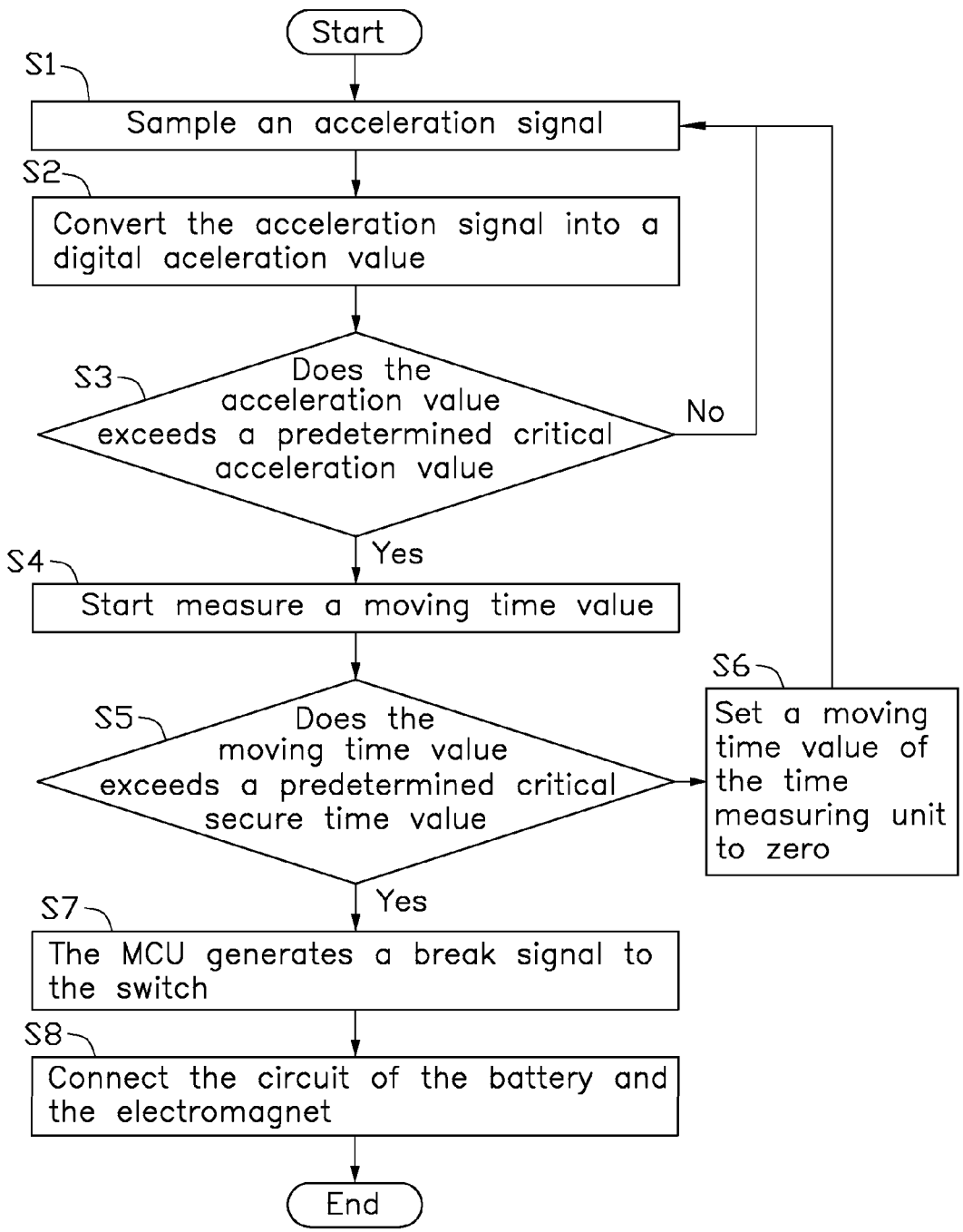
FIG. 4 is a flowchart of a work procedure of the control module of FIG. 3.

FIG. 4 is a flow chart illustrating an exemplary procedure for presenting an operation process according to the present disclosure. The flowchart will be explained with reference to FIG. 3.

When the portable electronic device 200 is powered on, in step S1, the acceleration transducer 261 detects any analog acceleration signal of the portable electronic device 200.

If so, in step S2, the ADC 262 converts the analog acceleration signal into a digital acceleration value. Then the procedure goes to step S3.

In step S3, the MCU 263 compares the digital acceleration value with the predetermined critical acceleration value stored in the memory 265. The procedure goes to the step S1 if the digital acceleration value is less than the critical acceleration value, or goes to step S4 if the digital acceleration value is greater than the critical acceleration value.

In step S4, the time measuring unit 267 starts measuring a moving time value. Then the procedure goes to step S5.

In step S5, the MCU 263 compares the moving time value with the critical secure time value stored in the memory 265. The procedure goes to the step S6 if the moving time value is less than the critical secure value, or goes to step S7 if the moving time value is greater than the critical secure time value.

In step S6, the time measuring unit 267 sets the value of the moving time to zero, and the procedure goes to step S1.

In step S7, the MCU 13 sends a break signal to the switch 249. Then the procedure goes to step S8.

In step S8, the switch 249 connects the circuit of the battery 248 and the electromagnet 247 in response to the break signal, the electromagnet 247 attracts the magnetic member 245 to rotate the connecting rod 241 relative to the hinge 243, and the pressing portion 2411 press the latching protrusion 2233 to pop out of the latching hole 2255, finally the compressed resilient member 21 is released, and ejected out from the container 22.

False acceleration readings can be manifested by short sudden accelerations such as when a person is jumping, swinging, or shaking their arms when holding the portable electronic device. The comparison of the moving time value with the critical secure time may avoid possible erroneous ejection of the resilient members 23. If the portable electronic device 200 falls from a distance greater than one meter, the portable electronic device electronic circuitries may be harmed. It is to be understood that, the time measuring unit 267 can be omitted.

It should be pointed out that, the hinge 243 can be omitted, and the actuating unit may further include a supporting bracket fixed in the main body. A middle part of the connecting rod is rotatably engaged with the supporting bracket.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:

1. A portable electronic device, comprising:
    a main body defining a plurality of mounting holes at corners thereof;
    a plurality of mounting modules;
    a plurality of resilient members compressed and mounted in the mounting holes of the main body by the corresponding mounting modules; and
    a control module, wherein the control module controls the mounting modules to release the compressed resilient members to eject the resilient members from the main body when a real-time acceleration value is larger than a critical acceleration value;
    wherein each mounting module comprises a latching unit and an actuating unit; the latching unit comprises a latching member and a container to receive the corresponding resilient member; the container comprises a base, a sidewall extending from a periphery of the base, the base and the sidewall cooperatively defining an opening facing the corresponding mounting hole, and a latching hole defined in the sidewall adjacent to the opening; the latching member defines a latching protrusion at a side thereof engaged in the latching hole; the actuating unit releases the resilient members from the containers by pressing the latching protrusions to be detached from the latching holes.

2. The portable electronic device of claim 1, wherein one end of the corresponding resilient member is fixed to an end surface of the latching member, the other end of the corresponding resilient member is resisted to the base of the container.

3. The portable electronic device of claim 2, wherein the latching member further defines an elongated slot in the end surface that fixes the resilient member.

4. The portable electronic device of claim 2, wherein the latching protrusion further defines a slanted side surface extending toward the end surface that fixes the resilient member.

5. The portable electronic device of claim 2, wherein the actuating unit comprises a connecting rod rotatably fixed in the main body, the connecting rod having a pressing portion adjacent to the latching protrusion, a magnetic member fixed to an end of the connecting rod away from the pressing portion, an electromagnet positioned adjacent to the magnetic member, a battery, and a switch, wherein the electromagnet, the battery, and the switch are electrically connected to form a circuit.

6. The portable electronic device of claim 5, wherein the actuating unit further comprises a hinge fixed in the main body, a middle part of the connecting rod is rotatably fixed to the hinge.

7. The portable electronic device of claim 5, wherein the magnetic member is a permanent magnet or an iron block.

8. The portable electronic device of claim 1, wherein the resilient members are bendable.

9. The portable electronic device of claim 1, wherein the critical acceleration is 9 m/s2.

10. The portable electronic device of claim 1, wherein the control module comprises a micro-controller unit (MCU); an acceleration transducer connected to the MCU to sample a real-time acceleration value, and a memory connected to the MCU to store the critical acceleration value.

11. The portable electronic device of claim 10, wherein the control module further comprises a time measuring unit connected to the MCU to sample a real-time moving time value, the memory stores a critical secure time value.

12. The portable electronic device of claim 11, wherein the critical secure time is 0.32 second.

* * * * *